United States Patent [19]

Harris et al.

[11] 4,187,590
[45] Feb. 12, 1980

[54] ELASTIC FASTENER

[75] Inventors: Richard D. Harris, Albany; Franklin G. Smith; Jerome F. Moshofsky, both of Portland, all of Oreg.

[73] Assignee: R. D. Bussard & Son, Inc., Albany, Oreg.

[21] Appl. No.: 936,322

[22] Filed: Aug. 24, 1978

Related U.S. Application Data

[63] Continuation-in-part of Ser. No. 789,024, Apr. 20, 1977, Pat. No. 4,118,835.

[51] Int. Cl.² .................. A44B 21/00; A44B 1/26
[52] U.S. Cl. .................. 24/73 P; 24/73 PF; 24/102 A; 24/209; 85/DIG. 2; 85/5 R
[58] Field of Search .............. 24/73 P, 73 PF, 209, 24/212, 102 A, 150 FP; 85/DIG. 2

[56] References Cited
U.S. PATENT DOCUMENTS

| 3,061,902 | 11/1962 | Holman | 24/102 P |
|---|---|---|---|
| 3,494,244 | 2/1970 | Wayland | 85/5 R |

*Primary Examiner*—Bernard A. Gelak
*Attorney, Agent, or Firm*—Klarquist, Sparkman, Campbell, Leigh, Hall & Whinston

[57] ABSTRACT

A one-piece elastic fastener includes a pair of spaced elastic, generally dish-shaped head members adapted to fit on opposite sides of pieces of material to be joined. The head members each have a rim and are disposed concavely inwardly with their rims facing each other. An elastic shank member joins the head members and is adapted to pass through an opening in the pieces of material. In one embodiment an elongated loop member is centrally attached to one of the head members and is adapted to pull it through an opening in the pieces of material to be joined. In another embodiment a boss is positioned on one of the head members and a hook is used to pull it through the opening.

4 Claims, 12 Drawing Figures

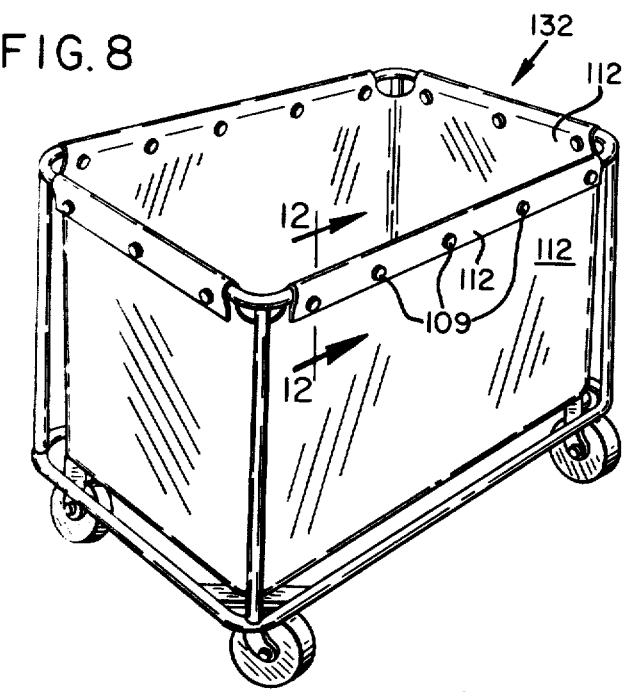
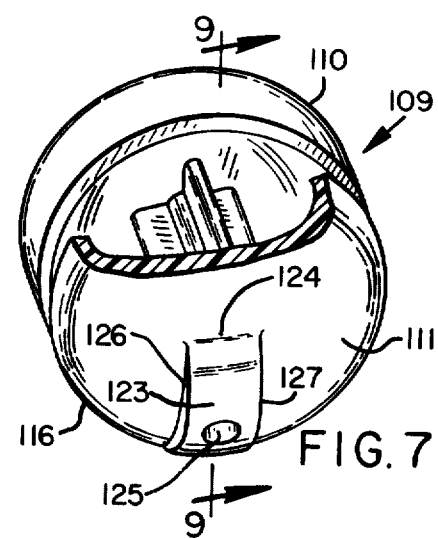
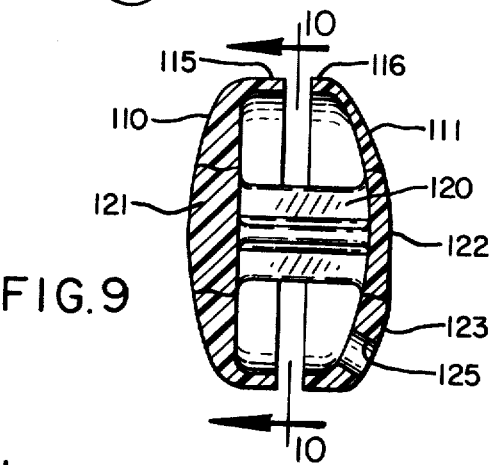
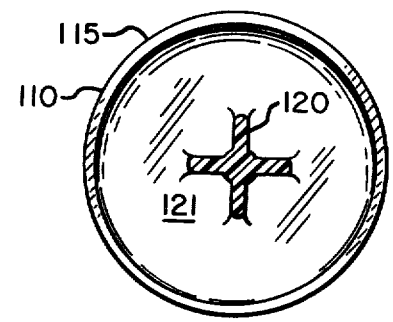
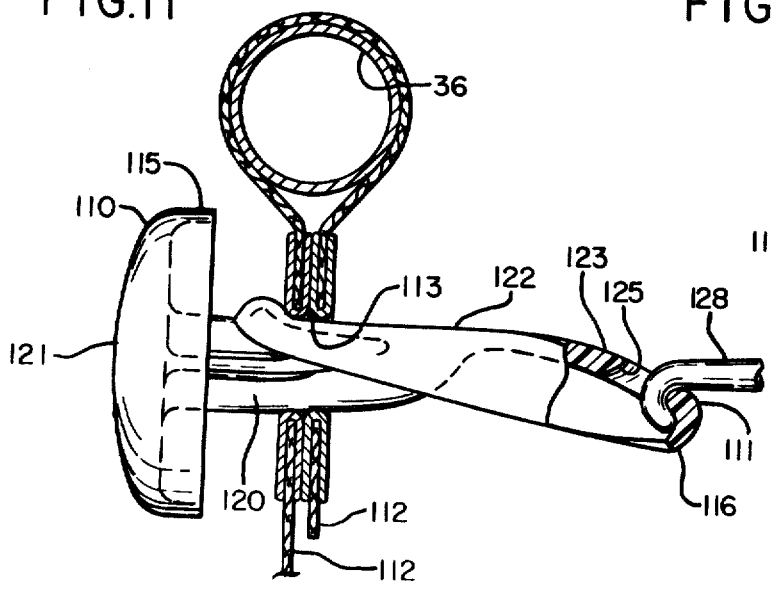
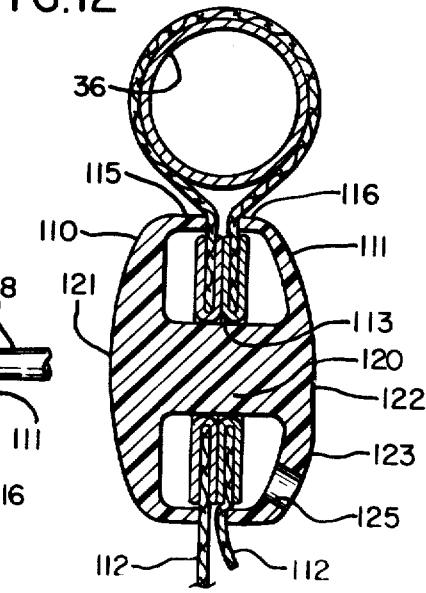

ELASTIC FASTENER

CROSS-REFERENCE TO RELATED APPLICATION

This application is a continuation-in-part of our co-pending application, Ser. No. 789,024, filed Apr. 20, 1977, now U.S. Pat. No. 4,118,835.

BACKGROUND OF THE INVENTION

1. Field of the Invention

The present invention relates to fasteners and more particularly to threadless elastic fasteners suitable for joining together two or more layers of either rigid or flexible material.

2. Description of the Prior Art

Heretofore two or more layers of rigid material have been joined together by various types of threaded fasteners such as screws or bolts, or by various types of threadless fasteners such as nails, staples or rivets, or by various types of bonding cements.

Layers of flexible materials such as fabrics can be joined together by some of the above fastening means such as bonding cements, staples and rivets. In addition, fabrics can be joined by thread or if provided with grommetted or other holes, by rope or cord. For example, heretofore fabric laundry baskets have been attached to their mobile metal frames by rope threaded through grommets along the doubled-over marginal edges of the fabric. However, such ropes wear out and must be replaced periodically, and such replacement is annoying, troublesome and time consuming.

Moreover all of the above-mentioned fastening means have certain disadvantages. For example, most of the above threaded and unthreaded fasteners require suitable tools or equipment for installation. Some such fasteners are also difficult and time-consuming to install. Bonding cements usually require special preparation of the materials to be joined and require selection of the proper cement to bond specific materials. Cement bonds, if not properly applied, or if of insufficient strength, may not be permanent.

Accordingly, there is a need for a quick and easy method and means for joining two or more layers of material together permanently, without the use of tools, to replace the aforementioned prior art fastening means and methods in selected applications.

SUMMARY OF THE INVENTION

The present invention comprises a one-piece rivet-like elastic fastener, and a method of fastening and fastened assembly utilizing the elastic fastener. The fastener, made of polyurethane, rubber or other materials having similar properties, is particularly suited for joining together several layers of flexible or rigid materials in applications in which the joints themselves will not be highly stressed in tension or shear. The elastic fastener of the invention has particular utility in joining together flexible materials such as canvas, fabric and plastic sheeting through grommetted openings.

The fastener of the present invention comprises a pair of elastic flange means adapted to fit on opposite sides of a plurality of pieces of material and retain the same in face-to-face juxtaposition. An elastic shank joins the flange means and is adapted to pass through an opening in the pieces of material. One of the flange means has a base thickness enabling it to be flexed to facilitate pulling it through the opening. The other of the flange means has a thicker base than the first flange means, thereby to resist flexing and passage through the opening. The fastener is desirably made of elastomeric material having a durometer of between about 65 and 75.

One embodiment of the fastener comprises elongated pulling means centrally attached to the less thick one of the pair of elastic flange means. Such pulling means desirably comprises an elongated loop adapted to pass through the opening in the pieces of material and pull the flange means therethrough.

Another embodiment of the fastener comprises a boss positioned on the less thick flange means and an aperture in the boss, whereby a hook member may be used to pull the less thick flange means through the opening.

The method of the present invention comprises forming a one-piece fastener having a pair of spaced elastic flange means adapted to fit on opposite sides of a plurality of pieces of material when the same are placed in face-to-face juxtaposition, an elastic shank joining the flange means and adapted to pass through aligned openings in the pieces of material to be joined, and pulling means attachable to one of the flange means to pull such one flange means in a direction opposed to the other flange means.

The method further comprises inserting the pulling means through the aligned openings in the pieces of material to be joined and then pulling one of the flange means through the opening, whereby the pair of flange means become seated on opposite sides of the assembly of materials to be joined.

Because of the elasticity of the fastener's shank and the action of the flanges, the assembled layers of material are held together in compression. The degree of compression of the materials at the joint can be controlled by controlling the relaxed length of the fastener shank as compared with the total thickness of the layers of material at the joint.

A primary object of the invention is to provide a fastener having the following characteristics, features and advantages:

(a) one-piece threadless construction;
(b) made from elastomeric material;
(c) high strength;
(d) high elasticity;
(e) economical;
(f) quick and easy installation;
(g) applicability to flexible and rigid materials;
(h) long life;
(i) high resistance to wear;
(j) high resistance to accidental removal;
(k) disposability;
(l) sanitary; and
(m) capability of sealing a joint Other primary objects are: to provide a method of joining layers of material together using a one-piece, threadless double-headed elastic fastener; and a fastened assembly including multiple layers of material joined together with a one-piece, threadless, double-headed elastic fastener.

DESCRIPTION OF THE DRAWINGS

FIG. 7 is a perspective view with parts broken away of another embodiment of a fastener made in accordance with the invention.

FIG. 8 is a perspective view of a laundry basket fabricated by use of the fastener of FIG. 7.

FIG. 9 is a side elevational section view, taken on line 9—9 of FIG. 7.

FIG. 10 is a view taken on line 10—10 of FIG. 9.

FIG. 11 is a side elevational section view of this embodiment of the invention as it is being pulled through pieces of material to be joined, as for example, in the fabrication of the basket of FIG. 8.

FIG. 12 is a sectional view taken on line 12—12 of FIG. 8 illustrating the fastener in its final position.

DESCRIPTION OF THE PREFERRED EMBODIMENTS

Figure 1:
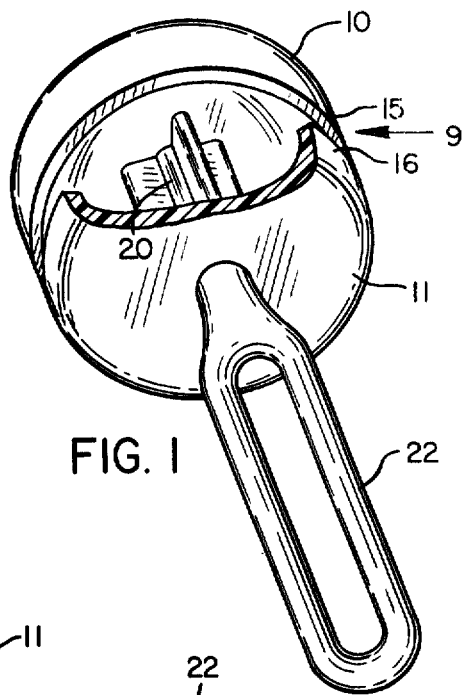
FIG. 1 is a perspective view with parts broken away of one embodiment of an elastic fastener made in accordance with the present invention.

In a first embodiment, an elastic fastener 9 is illustrated which generally resembles an installed rivet in shape but not in physical characteristics. As shown in FIGS. 1-6, it includes a pair of spaced elastic, generally dish-shaped head or flange members 10, 11 which are adapted to fit on opposite sides of a plurality of pieces of flexible material as, for example, pieces of coated fabric 12 having an opening 13 therethrough and in which a metal grommet 14 has been inserted in the usual fashion. Each of the head members 10, 11 has a rim 15, 16 respectively, extending circumferentially therearound. The head members 10, 11 are positioned such that their dish-shapes are disposed concavely inwardly with their rims 15, 16 facing each other.

Figure 4:
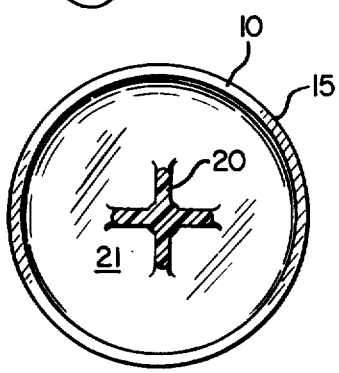
FIG. 4 is a view taken on line 4—4 of FIG. 3.

The head members 10, 11 are joined by an elastic shank member 20 which is adapted to pass through the opening 13 in the pieces of material 12. Desirably, shank member 20 may be fabricated in the shape of a cross as illustrated in FIG. 4, for simplicity in molding, although it may also be made in the shape of a tee, or it may be made of circular tubular or other desired cross sectional shape.

Figure 3:
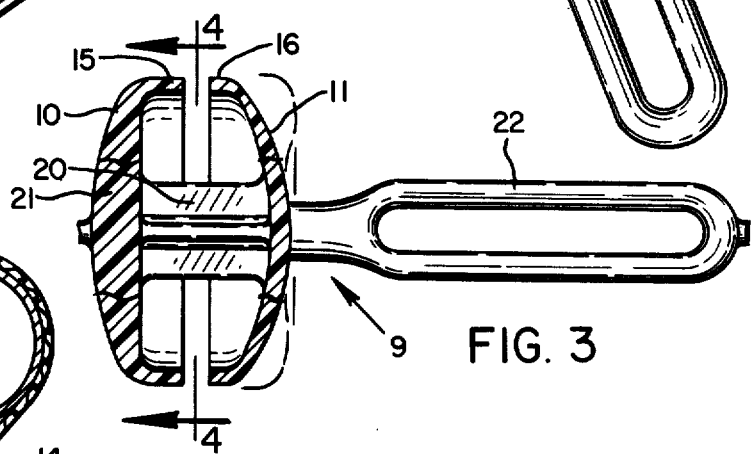
FIG. 3 is a side elevational view, partly in section, of this embodiment of the fastener, illustrating in dashed lines the deformability of one of the flange members which occurs during the insertion of the same through an opening in pieces of flexible material to be joined.
Figure 5:
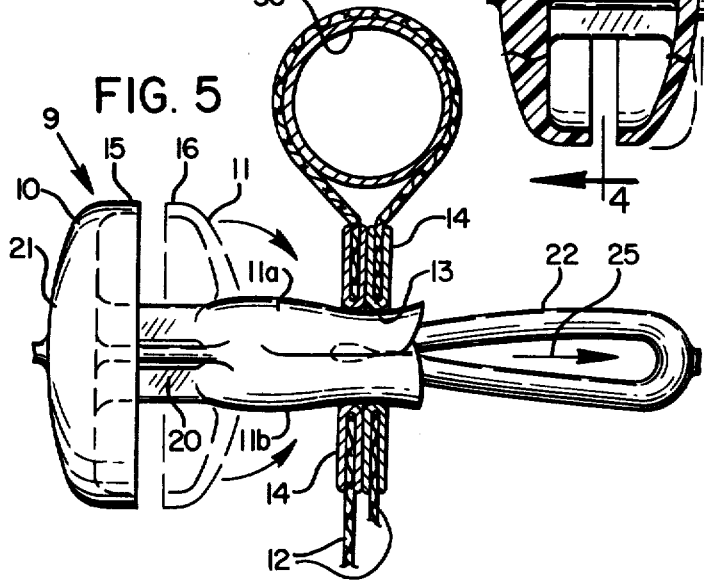
FIG. 5 is a side elevational view of this embodiment of the fastener as it is being inserted through pieces of material to be joined, as for example, in the fabrication of the basket illustrated in FIG. 2.
Figure 6:
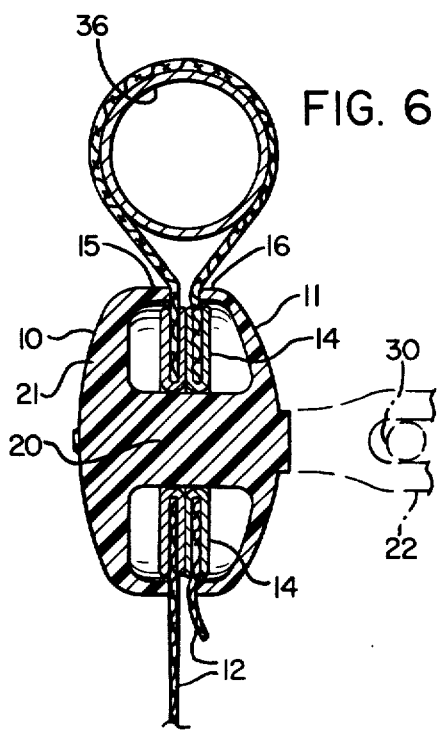
FIG. 6 is a sectional view taken on line 6—6 of FIG. 2, illustrating in dashed lines the pulling means optionally cut off after the fastener has been inserted through the opening in the materials and the flange members seated in their final position.

As illustrated in FIGS. 3, 5 and 6, one of the head members 10 is fabricated with a thicker bottom or base 21 than is the other head member 11 so as to resist flexing and thus resist being drawn through an opening in the material to which the fastener is to be attached during installation.

An elongated loop member 22 is centrally attached to the head member 11 and comprises a long, narrow loop in the shape of an eye member, whereby the loop member 22 may serve as a pulling means for pulling the head member 11 through opening 13 in the pieces of material 12 to be joined.

The fastener of the present invention is desirably made of elastomeric material such as polyurethane or rubber having a durometer of between about 65 and 75 and desirably, about 70. The fastener may be molded in an aluminum mold, for example, using a thermosetting polyurethane, or it may be fabricated from a cold-setting polyurethane which is heated in an extruder and then screw injected into a plastic mold and cured by cooling in the mold. Elastomers which are either heat setting or cold setting may be used. Alternatively, the fastener may be made from rubber by injection molding.

Although the head members 10, 11 in the fastener are illustrated as dish-shaped, they may be fabricated as flat flange members, or they may be made having a plurality or radially extending, finger-like flange members extending perpendicularly to the shank member 20. However, the dish-shaped flanges shown have the advantage of providing an effective water seal at the assembled joint, as will be apparent from FIG. 6.

A method of inserting the fastener of this embodiment through a plurality of flexible sheets of material, as for example, the multiple layers 12 illustrated in the drawings, comprises placing the fastener 9 in a position such that its longitudinal axis is perpendicular to the pieces 12 and centrally aligned with the openings 13 therethrough. The flange member 11 is then folded back along loop member 22, as illustrated in FIG. 5, to divide the flange member into two generally flattened portions 11a, 11b which extend outwardly of the fastener on opposite sides of the loop member 22. The loop member 22 is then inserted through the grommets 14 which define the opening 13 in the pieces of material 12, followed by at least the leading edges of the flattened portions 11a, 11b of the reversely folded-back flange member 11, as illustrated in FIG. 5. The loop member 22 is then pulled in the direction of the arrow 25 to pull the entire head member 11 through the opening 13 as shown. When the head member 11 emerges fully on the opposite side of the assembly from head member 10, the elasticity of the material causes member 11 to spring back to its original dish-shape, resulting in the rims 15, 16 being disposed on opposite sides of the pieces of material 12, thereby forming a snug permanent connection therebetween. As loop 22 is pulled to draw flange 11 through the grommet openings, the thickness of flange 10 causes it to resist being pulled through such openings. Thus shank 20, loop 22 and flange 11 are stretched greatly during the pulling process, reducing their cross-sectional dimensions so as to enable the mass of flange material 11 and loop 22 to slip through the openings although their combined masses when relaxed would not normally permit this.

If desired, a lever (not shown) may be inserted in the loop member 22 and used to pull the folded back portion 11a, 11b through the grommets 14 easily and quickly. Optionally, the loop member 22 may be cut off as illustrated in FIG. 6 after installation of the fastener to leave a generally rivet-like fastener forming the ultimate connection. Also, if the fastener is inserted through a very large opening, such as through an opening in a cyclone-type wire fence in attaching a windscreen to such fence, a locking stick 30 (FIG. 6) may be inserted through loop 22 after installation of the fastener to lock the fastener and screen to the fence.

A second embodiment 109 of the invention is illustrated in FIGS. 7-12. It also includes a pair of spaced elastic, generally dish-shaped head or flange members 110, 111 which are adapted to fit on opposite sides of a plurality of pieces of flexible material, as for example, the pieces of coated fabric 112 in the laundry basket 132 illustrated in FIG. 8. Each of the head members 110, 111 has a rim 115, 116, respectively, extending circumferentially therearound. Again, head members 110, 111 are positioned such that their dish-shapes are disposed concavely inwardly with their rims 115, 116 facing each other.

The head members 110, 111 are joined by an elastic shank member 120 which is adapted to pass through the opening 113 in the pieces of material 112. Again, shank member 120 is illustrated (FIG. 10) in the shape of a cross, although it may have other desired cross-sectional shapes.

As illustrated in FIGS. 9, 11 and 12, one of the head members 110 is fabricated with a thicker bottom or base 121 than is the other head member 111 to resist flexing and thus not pass through the opening 113 during installation.

In this embodiment the head member 111, with the less thick bottom or base 122, is molded with a protuberant part or boss 123 eccentrically positioned on the exterior of the head member 111. Boss 123 extends from about the center 124 of head member 111 to the rim 116 thereof and increases in thickness gradually from the center 124 to the rim 116. An apperture 125 is molded in boss 123 approximately adjacent rim 116. In the embodiment shown, boss 123 is molded with two parallel sides 126, 127 extending in the generally radial direction and its thickness increases from zero at about the center 124 to a maximum adjacent the rim 116.

To insert the fastener 109 through the sheets 112, the fastener is placed in a position such that its longitudinal axis is perpendicular to pieces 112 and generally aligned with the opening 113 therethrough. A hook 128 is inserted through the opening 113 and placed in engagement with the hole 125. Pulling the hook 128 then deformably pulls the head member 111 through the opening, as shown in FIG. 11. The thicker bottom 121 of member 110 prevents that member from being drawn through the opening. The presence of the boss 123 serves as a reinforcement for the aperture 125, therby to prevent any tearing of the head member 111. The final disposition of the fastener is shown in FIG. 12.

Figure 2:
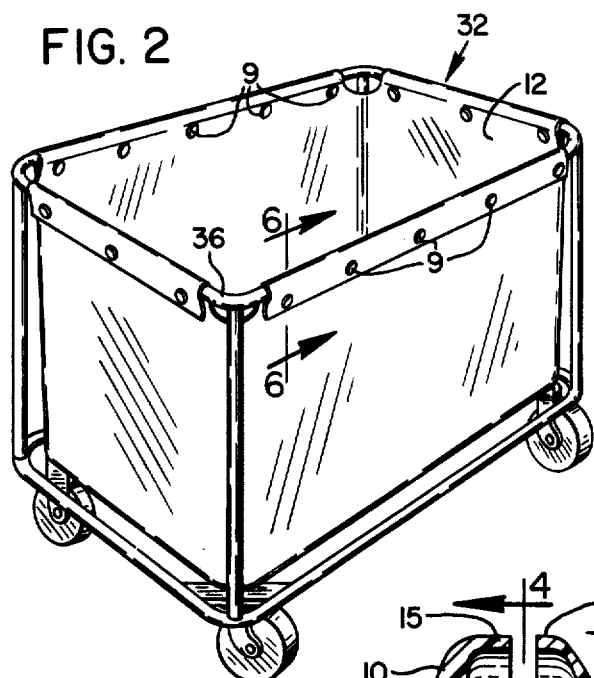
FIG. 2 is a perspective view of a laundry basket with sides of flexible material, such as plastic or cloth, the fabrication of which is facilitated by use of this embodiment of the fastener of the present invention.

The fasteners of the present invention are ideally suited for use in fabricating such articles as the laundry baskets 32 and 132 illustrated in FIGS. 2 and 8, replacing the rope usually used to tie the canvas or plastic material 12 to the basket frame 36. The fasteners are long lasting and do not require periodic replacement, unlike the aforementioned rope. The fasteners are also ideally suited for joining materials used in fabricating tennis court wind screens. Fasteners constructed in accordance with the present invention for permanent connections between flexible or rigid materials to be joined. They do not slip, nor will they accidentally pop out. p Fasteners according to the present invention can also be used in installations where sanitation is important. They are molded quickly and inexpensively. They are also quickly and efficiently installed.

The fasteners can be attached to a single layer of material in the manner described, and in the case of the embodiment of FIG. 1, the loop 22 used for attaching cord, rope or similar tiedown means, as in tent and tarpaulin applications.

Having illustrated and described the principles of our invention in two preferred embodiments, it should be apparent to those skilled in the art that such embodiments may be modified in arrangement and detail without departing from such principles. We claim as our invention all such modifications as come within the true spirit and scope of the following claims.

We claim:

1. An elastic fastener for fastening together layers of material, comprising:
   a pair of spaced elastic, generally dish-shaped head members adapted to fit on opposite sides of layers of material to be joined, said head members each each having a rim, said head members being disposed concavely inwardly with their rims facing each other;
   an elastic shank member joining said head members and adapted to pass through an opening in said layers or material,
   one of said dish-shaped head members having a thicker bottom and thus less flexibility than the other of said dish-shaped head members so as to resist passage through said opening;
   a boss positioned on the exterior of said other of said dish-shaped head members; and
   means disposed in said boss for releasably attaching a pulling means to said other of said dish-shaped head members for deformably pulling the same through said opening in said layers of material, thereby to position said head members on opposite sides of said layers of material and establish said fastener in place.

2. An elastic fastener as in claim 1, in which said boss is eccentrically positioned on said exterior of said other of said dish-shaped head members.

3. An elastic fastener as in claim 2, in which said boss extends from about the center of said other of said dish-shaped head members to about the rim thereof, said boss increasing in thickness in the direction of said rim.

4. An elastic fastener as in claim 3, in which said means disposed in said boss for releasably attaching said pulling means comprises an aperture through said boss adjacent said rim, said aperture being adapted to receive the end of a hook.

* * * * *